US008073792B2

(12) United States Patent
Hughes (10) Patent No.: US 8,073,792 B2
(45) Date of Patent: Dec. 6, 2011

(54) SYSTEM AND METHOD FOR CONTENT DEVELOPMENT

(75) Inventor: John M. Hughes, Hebron, CT (US)

(73) Assignee: TopCoder, Inc., Glastonbury, CT (US)

( * ) Notice: Subject to any disclaimer, the term of this patent is extended or adjusted under 35 U.S.C. 154(b) by 761 days.

(21) Appl. No.: 12/048,189

(22) Filed: Mar. 13, 2008

(65) Prior Publication Data

US 2008/0228681 A1    Sep. 18, 2008

Related U.S. Application Data

(60) Provisional application No. 60/906,928, filed on Mar. 13, 2007.

(51) Int. Cl.
*G06E 1/00* (2006.01)
*G06E 3/00* (2006.01)

(52) U.S. Cl. .................. 706/21; 725/86; 705/80; 705/53

(58) Field of Classification Search ........................ None
See application file for complete search history.

(56) References Cited

U.S. PATENT DOCUMENTS

| | | | |
|---|---|---|---|
| 4,525,599 A | 6/1985 | Curran et al. | |
| 5,195,033 A | 3/1993 | Samph et al. | |
| 5,513,994 A | 5/1996 | Kershaw et al. | |
| 5,779,549 A | 7/1998 | Walker et al. | |
| 5,794,207 A | 8/1998 | Walker et al. | |
| 5,799,320 A | 8/1998 | Klug | |
| 5,823,879 A | 10/1998 | Goldberg et al. | |
| 5,827,070 A | 10/1998 | Kershaw et al. | |
| 5,835,896 A | 11/1998 | Fisher et al. | |
| 5,862,223 A | 1/1999 | Walker et al. | |
| 5,916,024 A | 6/1999 | Von Kohorn | |
| 5,933,811 A | 8/1999 | Angles et al. | |
| 5,947,747 A | 9/1999 | Walker et al. | |
| 5,963,916 A | 10/1999 | Kaplan | |
| 5,970,475 A | 10/1999 | Barnes et al. | |
| 5,987,302 A | 11/1999 | Driscoll et al. | |

(Continued)

FOREIGN PATENT DOCUMENTS

WO    WO-97/39811 A1    10/1997

OTHER PUBLICATIONS

AssessNet Features and Benefits http://web.archive.org/web/20001018210736/www.assessnet.com/features.htm. Retrieved on Oct. 21, 2008 (2 pages).

(Continued)

*Primary Examiner* — Omar Fernandez Rivas
*Assistant Examiner* — Kalpana Bharadwaj
(74) *Attorney, Agent, or Firm* — Goodwin Procter LLP (57) ABSTRACT

This invention relates to a system and methods for developing content. In general, in one aspect, a method for developing content includes electronically distributing a specification for content to a distributed community of content developers, receiving submissions from each of a subset of the community of content developers in response to the distributed specification, holding a first vote in which a group of voters rank a first number of submissions and identify the order in which they predict the submissions will be ranked by others, selecting the highest scoring submissions in the first vote, holding a second vote to evaluate the submissions that receive the highest score in the first vote; and selecting a winner based on the second vote.

10 Claims, 5 Drawing Sheets

U.S. PATENT DOCUMENTS

| | | | |
|---|---|---|---|
| 5,995,951 | A | 11/1999 | Ferguson |
| 6,010,403 | A | 1/2000 | Adam et al. |
| 6,012,984 | A | 1/2000 | Roseman |
| 6,055,511 | A | 4/2000 | Luebbering et al. |
| 6,088,679 | A | 7/2000 | Barkley |
| 6,112,049 | A | 8/2000 | Sonnenfeld |
| 6,174,237 | B1 | 1/2001 | Stephenson |
| 6,193,610 | B1 | 2/2001 | Junkin |
| 6,224,486 | B1 | 5/2001 | Walker et al. |
| 6,264,560 | B1 | 7/2001 | Goldberg et al. |
| 6,293,865 | B1 | 9/2001 | Kelly et al. |
| 6,301,574 | B1 | 10/2001 | Thomas et al. |
| 6,341,212 | B1 | 1/2002 | Shende et al. |
| 6,345,239 | B1 | 2/2002 | Bowman-Amuah |
| 6,356,909 | B1 | 3/2002 | Spencer |
| 6,397,197 | B1 | 5/2002 | Gindlesperger |
| 6,408,283 | B1 | 6/2002 | Alaia et al. |
| 6,427,132 | B1 | 7/2002 | Bowman-Amuah |
| 6,431,875 | B1 | 8/2002 | Elliott et al. |
| 6,434,738 | B1 | 8/2002 | Arnow |
| 6,453,038 | B1 | 9/2002 | McFarlane et al. |
| 6,513,042 | B1 | 1/2003 | Anderson et al. |
| 6,532,448 | B1 | 3/2003 | Higginson et al. |
| 6,569,012 | B2 | 5/2003 | Lydon et al. |
| 6,578,008 | B1 | 6/2003 | Chacker |
| 6,604,997 | B2 | 8/2003 | Saidakovsky et al. |
| 6,606,615 | B1 | 8/2003 | Jennings et al. |
| 6,631,404 | B1 | 10/2003 | Philyaw |
| 6,636,892 | B1 | 10/2003 | Philyaw |
| 6,658,642 | B1 | 12/2003 | Megiddo et al. |
| 6,659,861 | B1 | 12/2003 | Faris et al. |
| 6,662,194 | B1 | 12/2003 | Joao |
| 6,718,535 | B1 | 4/2004 | Underwood |
| 6,761,631 | B2 | 7/2004 | Lydon et al. |
| 6,791,588 | B1 | 9/2004 | Philyaw |
| 6,824,462 | B2 | 11/2004 | Lydon et al. |
| 6,859,523 | B1 | 2/2005 | Jilk et al. |
| 6,895,382 | B1 | 5/2005 | Srinivasan et al. |
| 6,910,631 | B2 | 6/2005 | Knowles et al. |
| 6,915,266 | B1 | 7/2005 | Saeed et al. |
| 6,938,048 | B1 | 8/2005 | Jilk et al. |
| 6,952,678 | B2 | 10/2005 | Williams et al. |
| 6,963,850 | B1 | 11/2005 | Bezos et al. |
| 6,970,677 | B2 | 11/2005 | Jongsma et al. |
| 6,984,177 | B2 | 1/2006 | Lydon et al. |
| 6,993,496 | B2 | 1/2006 | Pittelli |
| 7,027,997 | B1 | 4/2006 | Robinson et al. |
| 7,054,464 | B2 | 5/2006 | Poor |
| 7,155,400 | B1 | 12/2006 | Jilk et al. |
| 7,162,198 | B2 | 1/2007 | Kuntz et al. |
| 7,162,433 | B1 | 1/2007 | Foroutan |
| 7,207,568 | B2 | 4/2007 | France et al. |
| 7,234,131 | B1 | 6/2007 | Speyrer et al. |
| H2201 | H | 9/2007 | Stytz et al. |
| 7,292,990 | B2 | 11/2007 | Hughes |
| 7,300,346 | B2 | 11/2007 | Lydon et al. |
| 7,311,595 | B2 | 12/2007 | Lydon et al. |
| 7,331,034 | B2 | 2/2008 | Anderson |
| 7,386,831 | B2 | 6/2008 | Flanagan |
| 7,392,285 | B2 | 6/2008 | Philyaw |
| 7,401,031 | B2 | 7/2008 | Hughes |
| 7,412,666 | B2 | 8/2008 | Philyaw |
| 7,416,488 | B2 | 8/2008 | Peterson et al. |
| 2001/0032170 | A1 | 10/2001 | Sheth |
| 2001/0032189 | A1 | 10/2001 | Powell |
| 2001/0034631 | A1 | 10/2001 | Kiselik |
| 2001/0037281 | A1 | 11/2001 | French et al. |
| 2001/0039529 | A1 | 11/2001 | Hoffman |
| 2001/0049615 | A1 | 12/2001 | Wong et al. |
| 2001/0049648 | A1 | 12/2001 | Naylor et al. |
| 2002/0026321 | A1 | 2/2002 | Faris et al. |
| 2002/0035450 | A1 | 3/2002 | Thackston |
| 2002/0038221 | A1 | 3/2002 | Tiwary et al. |
| 2002/0069076 | A1 | 6/2002 | Faris et al. |
| 2002/0077963 | A1 | 6/2002 | Fujino et al. |
| 2002/0107972 | A1 | 8/2002 | Keane |
| 2002/0116266 | A1 | 8/2002 | Marshall |
| 2002/0120501 | A1 | 8/2002 | Bell et al. |
| 2002/0120553 | A1 | 8/2002 | Bowman-Amuah |
| 2002/0124048 | A1 | 9/2002 | Zhou |
| 2002/0161696 | A1 | 10/2002 | Gebert |
| 2003/0009740 | A1 | 1/2003 | Lan |
| 2003/0018559 | A1 | 1/2003 | Chung et al. |
| 2003/0046681 | A1 | 3/2003 | Barturen et al. |
| 2003/0060910 | A1 | 3/2003 | Williams et al. |
| 2003/0192029 | A1 | 10/2003 | Hughes |
| 2004/0210550 | A1 | 10/2004 | Williams et al. |
| 2005/0027582 | A1 | 2/2005 | Chereau et al. |
| 2005/0160395 | A1 | 7/2005 | Hughes |
| 2006/0026067 | A1* | 2/2006 | Nicholas et al. ................ 705/14 |
| 2006/0052886 | A1 | 3/2006 | Lydon et al. |
| 2006/0184384 | A1 | 8/2006 | Chung et al. |
| 2006/0184928 | A1 | 8/2006 | Hughes |
| 2006/0248504 | A1 | 11/2006 | Hughes |
| 2007/0050419 | A1* | 3/2007 | Weyl et al. .................... 707/200 |
| 2007/0180416 | A1 | 8/2007 | Hughes |
| 2007/0186230 | A1 | 8/2007 | Foroutan |
| 2007/0219958 | A1* | 9/2007 | Park et al. ........................ 707/3 |
| 2007/0220479 | A1 | 9/2007 | Hughes |
| 2007/0226062 | A1 | 9/2007 | Hughes et al. |
| 2007/0244749 | A1 | 10/2007 | Speiser et al. |
| 2007/0281771 | A1 | 12/2007 | Lydon et al. |
| 2007/0288107 | A1 | 12/2007 | Fernandez-Ivern et al. |
| 2008/0027783 | A1 | 1/2008 | Hughes et al. |
| 2008/0052146 | A1 | 2/2008 | Messinger et al. |
| 2008/0167960 | A1 | 7/2008 | Hughes |
| 2008/0196000 | A1 | 8/2008 | Fernandez-Ivern et al. |
| 2008/0228681 | A1 | 9/2008 | Hughes |
| 2008/0281610 | A1 | 11/2008 | Yoshida et al. |
| 2008/0281616 | A1 | 11/2008 | Johnson |
| 2008/0320436 | A1 | 12/2008 | Hughes |
| 2009/0007074 | A1 | 1/2009 | Campion et al. |
| 2009/0024457 | A1 | 1/2009 | Foroutan |
| 2009/0203413 | A1 | 8/2009 | Jefts et al. |

OTHER PUBLICATIONS

Bennett, Lynda et al. "Forging an Outsourcing Partnership that Works" IPCC 94, pp. 406-410, 1994.

Brainbench Standard Assessments: http://www.brainbench.com/xml/bb/business/productsservices/products/assessments/standardassessm, Retrieved on Mar. 10, 2004 (1 page).

Dhillon, Gurprett Outsourcing of IT service Provision Issues, Concerns and Some Case Examples, 20 pages, Fall 2002.

Fink, William & Joyce Dick. Computer Programming Tournament as a learning Experience. The Computer Education Quarterly. Summer 1989, vol. 11, Issue 2 pp. 46-52.

Forsberg et al., "Managing Outsourcing of Software Development" 48 pages, Spring 2001.

Google Programming Contest, First Annual Google Programming Contest, http://web.archive.org/web/20020207103456/http://www.google.com/programming-contest/index.html Retrieved from the Internet Mar. 5, 2009, 4 pages.

http://www.programmingbids.com/, informational webpages retrieved from the Internet Nov. 29, 2001, 15 pages.

International Search Report and Written Opinion for PCT/US2007/009477, dated mailed Nov. 21, 2008, 7 pages.

IPER for PCT/US07/009477 Dec. 16, 2008—6 pages.

IPER for PCT/US07/12792 Nov. 10, 2008—3 pages.

ISR for PCT/US07/12792 Nov. 10, 2008—3 pages.

Kirsner, Scott, "The New Rules", http://www.topcoder.com/index?t=news_events&c=article_bglobe, downloaded from the Internet Jun. 21, 2006, 4 pages.

O'Sullivan, Kate. "Best of the Web: Testing Recruits, Net-Style" Dec. 2000, pp. 1-5. <http://pf.inc.com/magazine/20001201/21124.html>, Retrieved from the Internet on Jul. 28, 2006.

PCT/US2007/010414, International Preliminary Report on Patentability, Written Opinion of the International Searching Authority, Oct. 30, 2008, pp. 1-5.

Pohl, Wolfgang, "Classification of Computer Science Competitions" Powerpoint presentation slides printout, 7 pages, Dagstuhl, Germany, Jan. 23, 2006.

Pohl, Wolfgang, Suggestions for CS Competitions (Task, Exam, Automatic Grading) Powerpoint presentation slides printout, 7 pages, Dagstuhl, Germany, Jan. 24, 2006.

Programming Contest Control System (PC2) (<http://ecs.csus.edu/pc2/>, internet archive, retrieved from the internet Mar. 5, 2009) 2 pages.

Prove It! http://web.archive.org/web/20001018111056/www.proveit.com/ Retrieved on Oct. 21, 2008 (1 page).

Reviewnet Screening: http://web.archive.org/web/20010110233500/http://reviewnet.net/ReviewNetScreening.html [Retrieved on Oct. 21, 2008 (3 pages).

The Rules of the 2001 ACM Regional Programming Contests Sep. 10, 2001, FINAL (from http://web.archive.org/web/20011224151037/icpc.baylor.edu/icpc,/Regionals/About.htm), Retrieved from the Internet Mar. 5, 2009 (5 pages).

TopCoder Homepage, <http://web.archive.org/web20010516213901/http://www.topcoder.com/> retrieved Oct. 19, 2006 (1 page).

Van Wegberg and Berends, "Competing communities of users and developers of computer software: competition between open source software and commercial software", May 2000, i, 1-13, University of Maastrict, The Netherlands.

Verhoeff, Tom "The IOI Is (Not) a Science Olympiad", text and description, Oct. 2005, The Netherlands, 9 pages.

Voas, "Certifying Off-the-Shelf Software Components", Jun. 1998, 53-59, Sterling, VA.

Ward, Donald L. "Aircraft Information Systems Support SOL 9-Bj2-Z19-1-31I DUE 061401 POC" 2 pages, Jun. 11, 2001.

WebValuate.com http://web.archive.org/web20001019020801/http://webvaluate.com/ Retrieved on Oct. 21, 2008 (1 page).

WO for PCT/US07/009477 Nov. 7, 2008—5 pages.

WO for PCT/US07/12792 Nov. 10, 2008—3 pages.

\* cited by examiner

SYSTEM AND METHOD FOR CONTENT DEVELOPMENT

PRIORITY

This application claims priority to, and the benefit of, U.S. Provisional Patent Application Ser. No. 60/906,928, filed Mar. 13, 2007, entitled "System and Method for Content Development," by John M. Hughes.

TECHNICAL FIELD

This invention relates to computer-based methods and systems for developing content and, more particularly, to methods and systems for facilitating the distributed development of content.

BACKGROUND INFORMATION

It can be challenging to develop content that is appreciated by many different people. It may be useful to quickly and inexpensively develop content that will be appreciated by many different people, for example, people within a company, as well as by the company's customers and business partners.

SUMMARY OF THE INVENTION

All types of content development projects, including without limitation such projects as web page design, user interface design, banner and other advertising design, stationary design, software application design, music and song composition, have both aesthetic and business aspects, and help form an impression that a customer, end user, audience member, or business partner has of an organization and/or its products.

Organizations need a way to quickly and efficiently develop content that will be received positively by their target audience. It can be difficult to efficiently generate a number of different ideas and then identify the one that will be best received by the target audience. One technique that can help address these concerns is to use a series of competitions, in which a number of content developers submit candidate submissions for selection. Having different people work on the development helps generate many different approaches.

Once different submissions are generated, however, it is still necessary to select the submission(s) preferred by a target audience. This may be the submission(s) that the audience themselves prefer, or the submission(s) that the audience predicts the target audience will prefer.

In general, in one aspect, a method for developing content includes electronically distributing a specification for content to a distributed community of content developers, receiving submissions from each of a subset of the community of content developers in response to the distributed specification, holding a first vote in which a group of voters rank a first number of submissions and identify the order in which they predict the submissions will be ranked by others, selecting the highest scoring submissions in the first vote, holding a second vote to evaluate the submissions that receive the highest score in the first vote; and selecting a winner based on the second vote.

Once selected, the content developer who developed the selected submission, or another content developer, can be engaged for future work in connection with the content.

In general, another aspect of the invention relates to a system for implementing the methods just described. The system includes a communications module for electronically distributing requirements for content to a distributed community of content developers and receiving submissions from each of a subset of the community of content developers in response to the requirements. The system includes an review module for facilitating evaluation of a subset of the received submissions by a number of reviewers; and a selection module for selecting a preferred submission in response to the facilitated review of the submissions. The system includes a facility for supporting a first vote in which reviewers rank a predetermined number of submissions and identify the order in which they predict the submissions will be ranked by others. The system also includes a facility for selecting the highest scoring submissions in the first vote, and holding a second vote to evaluate the submissions that received the highest score in the first vote, and selecting a winner based on the second vote.

In one embodiment of this aspect of the invention, the system further includes a rating engine for rating the skills of the members of the distributed community of content developers. The system can, in some embodiments, further include a reviewing module to allow members of the distributed community to review content.

For example, in one embodiment, the techniques described here are used to develop a set of web pages for a web site. The submission may include a web site design, as well as content. Content developers receive a specification for the requested content. The submission may include text, graphics, and so forth. The submissions are made available for review and evaluation by a group of reviewers. The reviewers may be, for example, members of a community of content developers. A first vote is conducted using a first voting method to narrow down the submissions to a predetermined number of finalists (e.g., 3 finalists). Another vote, using another voting method, is then held to determine the most preferred of the finalists. For example, in one embodiment, the first voting method is a prediction voting method, in which voters are asked to select five (5) submissions out of a predetermined number (e.g., 50) and rank them based on which submissions they think other voters also will rank as the highest. In short, voters are asked to predict which submissions will rank the highest, and in what order. A selected number of high scorers from the prediction vote are then entered in a second contest where voters are asked to rank the finalists from best to worst. A method such as the Schulze Method may be used to determine the winner.

In some embodiments, awards are provided to the finalists. In some embodiments the submitter of the winning submission receives a first reward, the submitter of the second place finisher receives a second place award, and so forth. In some embodiments, awards are provided to one or more participants in the first contest who predicted the finalists and/or the participants.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
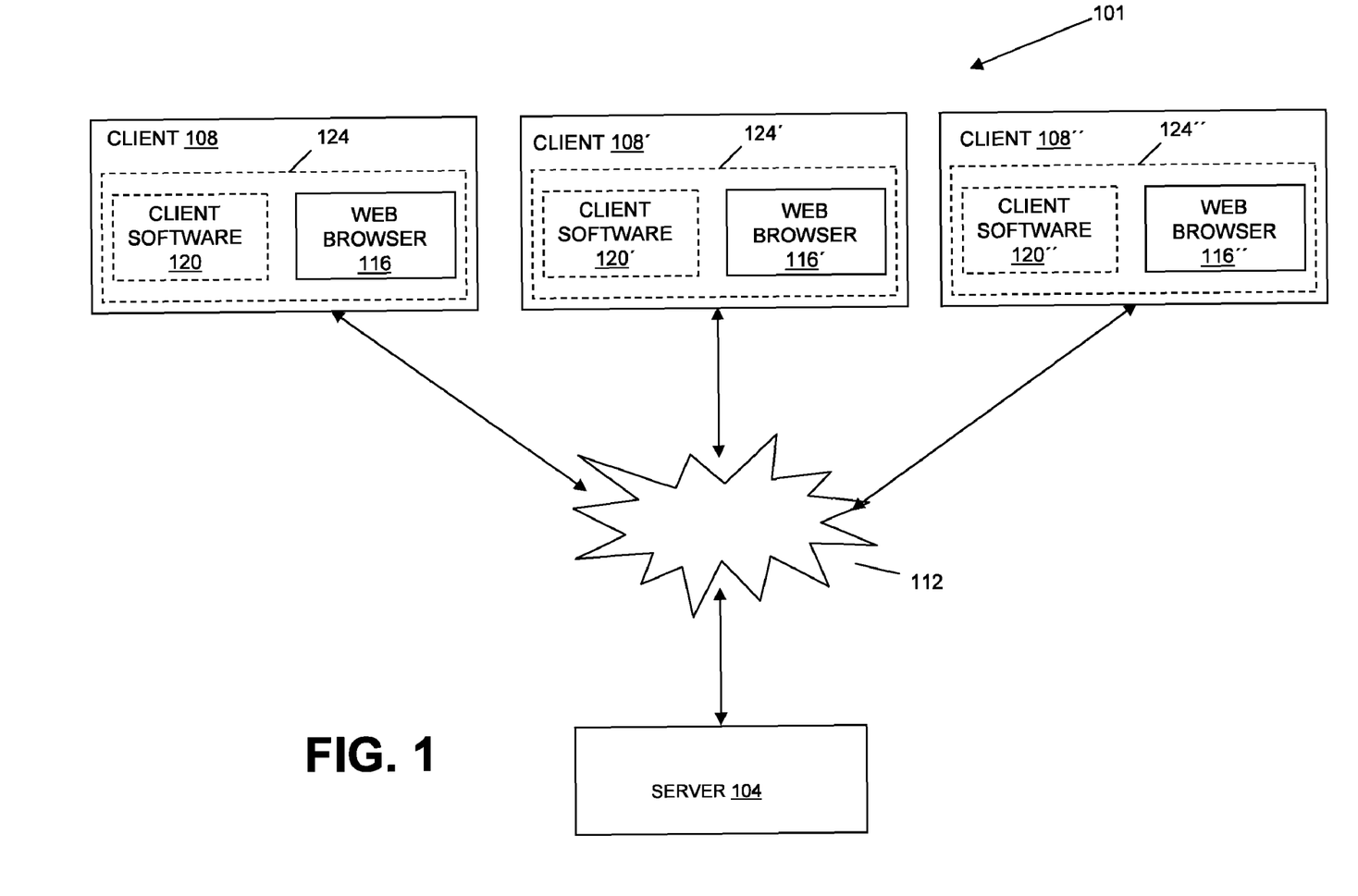
FIG. 1 is a block diagram of an embodiment of a distributed content development system having a server according to the invention.

Referring to FIG. 1, in one embodiment, a distributed content development system 101 includes at least one server 104, and at least one client 108, 108', 108", generally 108. As shown, the distributed content development system includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, wireless device, wireless telephone, information appliance, workstation, minicomputer, mainframe computer, or other computing device, that is operated as a general purpose computer, or a special purpose hardware device used solely for serving as a client 108 in the distributed content development system.

Generally, in some embodiments, clients 108 can be operated and used by content developers to participate in various content development activities. Examples of content development activities include, but are not limited to participation the content development projects described here. Clients 108 can also be operated by entities who have requested that the content developers develop content (e.g., customers). The customers may use the clients 108 to review content developed by the content developers, post specifications for the development of content, view information about the content developers, as well as other activities described here. The clients 108 may also be operated by a facilitator, acting as an intermediary between the customers and the content developers.

In various embodiments, the client computer 108 includes a web browser 116, client software 120, or both. The web browser 116 allows the client 108 to request a web page or other downloadable program, applet, or document (e.g., from the server 104) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, in another embodiment, the client 108 automatically makes requests with the web browser 116. Examples of commercially available web browser software 116 are INTERNET EXPLORER, offered by Microsoft Corporation, NETSCAPE NAVIGATOR, offered by AOL/Time Warner, or FIREFOX offered by the Mozilla Foundation.

In some embodiments, the client 108 also includes client software 120. The client software 120 provides functionality to the client 108 that allows a content developer to participate, supervise, facilitate, or observe content development activities described above. The client software 120 may be implemented in various forms, for example, it may be in the form of a Java applet that is downloaded to the client 108 and runs in conjunction with the web browser 116, or the client software 120 may be in the form of a standalone application, implemented in a multi-platform language such as .Net or Java, or in native processor executable code. In one embodiment, if executing on the client 108, the client software 120 opens a network connection to the server 104 over the communications network 112 and communicates via that connection to the server 104. The client software 120 and the web browser 116 may be part of a single client-server interface 124; for example, the client software can be implemented as a "plug-in" to the web browser 116.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links (802.11, bluetooth, etc.), and so on, and any combination. Preferably, the network 112 can carry TCP/IP protocol communications, and HTTP/HTTPS requests made by the web browser 116 and the connection between the client software 120 and the server 104 can be communicated over such TCP/IP networks. The type of network is not a limitation, however, and any suitable network may be used. Non-limiting examples of networks that can serve as or be part of the communications network 112 include a wireless or wired ethernet-based intranet, a local or wide-area network (LAN or WAN), and/or the global communications network known as the Internet, which may accommodate many different communications media and protocols.

The servers 104 interact with clients 108. The server 104 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of users and the size of the user base. For example, the server 104 may be or may be part of a logical group of one or more servers such as a server farm or server network. As another example, there may be multiple servers 104 that may be associated or connected with each other, or multiple servers could operate independently, but with shared data. In a further embodiment and as is typical in large-scale systems, the application software may be implemented in components, with different components running on different server computers, on the same server, or some combination.

In some embodiments, the server 104 also can include a contest server, such as described in U.S. Pat. Nos. 6,569,012 and 6,761,631, entitled "Systems and Methods for Coding Competitions" and "Apparatus and System for Facilitating Online Coding Competitions" respectively, both by Lydon et al, and incorporated by reference in their entirety herein.

In one embodiment, the server 104 and clients 108 enable the distributed content development of content by one or more content developers, which developers may or may not be associated with the entity requesting the development of the content.

In one embodiment, the content is a design, such as an aesthetic design. Generally, an aesthetic design is a representation of a decorative, artistic and/or technical work that is created by the designer. For example, the design can be a graphic design, such as a logo, a graphic, or an illustration. The design can be a purposeful or inventive arrangement of parts or details. For example, the design can be the layout and graphics for a web page, web site, graphical user interface, and the like. The design can be a basic scheme or pattern that affects and controls function or development. For example, the design can be a prototype of a web page or pages, a software program or an application. As another example, the design can be a product (including without limitation any type of product, e.g., consumer product, industrial product, office product, vehicle, etc.) design or prototype. The design also can be a general or detailed plan for construction or manufacture of an object. For example, the design can be a product design. The design can be the design for a computer program. The content may be, or may include without limitation, a web page, content for a web page, a computer program, text, an article, picture, visual and/or video content, music, sounds, graphical design, architectural works, or any other type of content.

In one embodiment, the content is a logo that a company intends to use on its web site, business cards, signage, stationary, and/or marketing collateral and the like. In another embodiment, the design is a web page template, including colors, graphics, and text layout that will appear on various pages within a particular web site.

In one embodiment, the design is a requirements specification for a software program, including the requirements that the program must meet.

Figure 2:
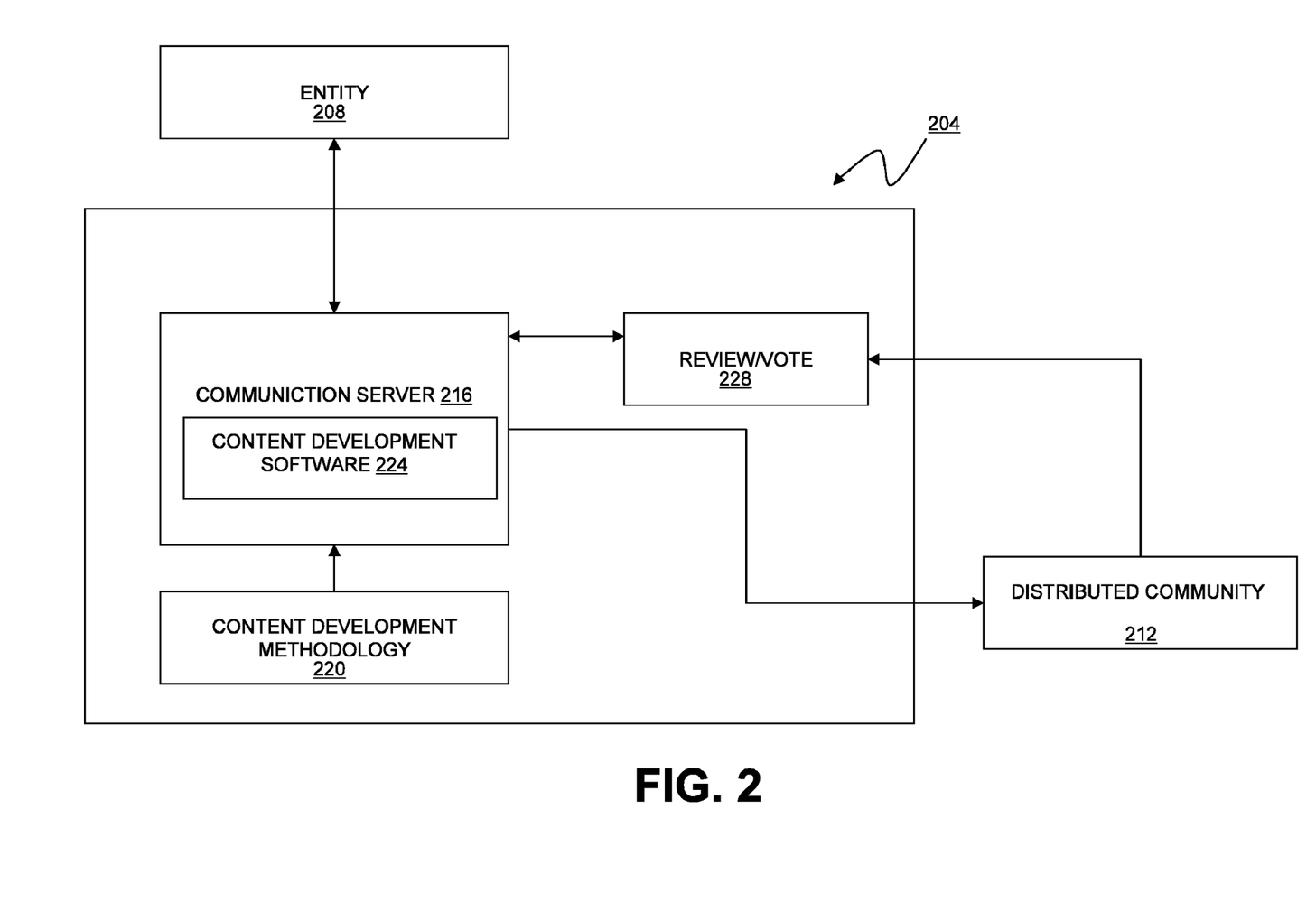
FIG. 2 is a block diagram of one embodiment of a content development domain according to an embodiment of the invention.

Referring to FIG. 2, a content development domain 204 can be used to provide an entity 208 with high-quality content. One or more content developers can be identified and/or selected by various methods from a distributed community of content developers 212, and subsequently used to develop content. For example, the content developers may be employees of, consultants to, or members of an organization, enterprise, or a community fostering collaborative and distributed content development. In some cases, the content developers may have no other formal or informal relationship to each other. In some embodiments, one or more of the content developers may act as a project manager who is responsible for organizing and coordinating the efforts of other developers. The project manager may also specify items such as, without limitation, the cost of the project, the project schedule, and the project risks. In one embodiment, the project manager creates a project plan for the project, which may include, without limitation, an estimated project cost and schedule, and a requirements document describing, for example, the parameters of the content, and the scope and risks of the project.

In some embodiments, the content developers may include architects, designers, programmers, quality assurance engineers, as well as other content development roles.

In one embodiment, the content development domain 204 includes a communication server 216, development methodology 220, content development software 224, and a review/voting mechanism 228. The communication server provides a conduit through which the external entity 208, the community of content developers 212, and the reviewers (also referred to as voters) can interact, for example, to provide documentation, submit content, elicit and offer feedback, review submitted content, and potentially rate and/or select submitted content. In some embodiments, the communication server is or operates as part of the server 104 as described above, whereas in other cases the communication server may be a separate server, which may be operated by and/or outsourced to an application service provider (ASP), internet service provider (ISP), or other third-party.

The structured content development methodology 220 provides a framework for the development of content. The methodology 220 may specify a common vocabulary, a set of deliverables, as well as any other aspects of the content development process. Furthermore, by using a structured methodology, the participants, (e.g., developers 212, the entity 208) can communicate effectively, and the outputs of each development process step are known and can be verified, thus reducing the cost and time necessary to produce quality content.

The content development software 224 may provide an operational mechanism for implementing the methodology 220, and in some implementations a content development environment in which the content developers can do one or more of develop, alter, combine, view, test, submit, and verify content. In some embodiments, as shown, components of the software 224 may reside on the server 104, whereas some components may be included in client software residing on a client, e.g., as described above. For example, the content development software 224 can include one or more stand-alone software applications that execute on a client 108. The content development software 224 optionally can include one or more modules such as a design library, stock photo library, and so forth, from which content developers may access previously developed content and/or templates that may be used in content development and/or documentation; a documentation feature that provides information about terms, syntax, and functions; as well as other useful functions.

Figure 3:
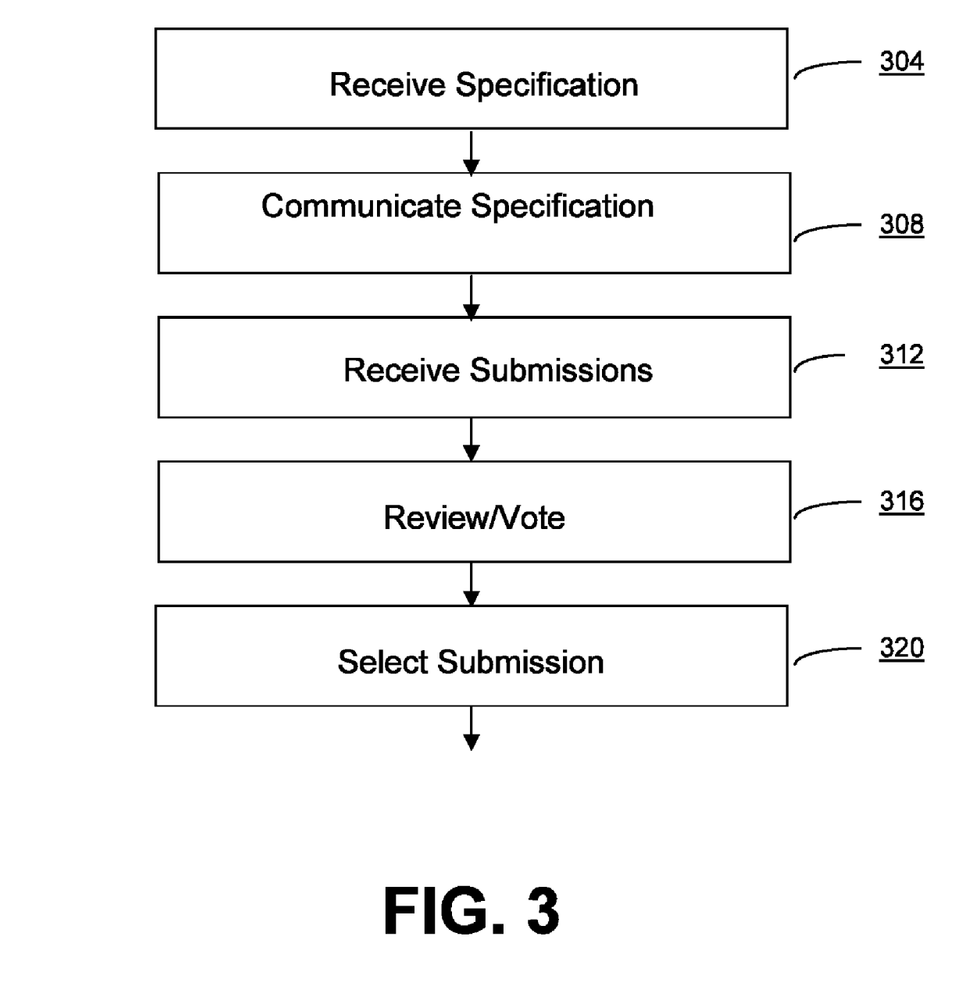
FIG. 3 is a flow chart depicting steps performed in developing content according to an embodiment of the invention.

FIG. 3 provides a summary illustration of one embodiment of a method for developing content, for example, using the content development domain 204 described above. The communication server 216 receives a specification (STEP 304) describing the desired content. The specification can include such information as the type of content, the size of the deliverables, size and color requirements, desired or undesired themes, content that may or may not be included, background information for creating the content, acceptable files types and formats for the submission, required documentation, and the like. The specification may then be communicated to the distributed community of content developers 212 (STEP 308). The specification can be communicated by posting to a web site that is accessed by members of the distributed community of content developers. The specification (and/or a link to the specification) can be communicated via email, instant message (IM), or through any other suitable communication technique. The specification can also include any timing deadlines for response, and the prize to be paid for one or more selected (e.g., winning) submission(s). For example, a prizes can be awarded for first, second, and third place, and the prizes described in the specification.

One or more of the content developers in the community 212 creates a submission in response to the requirements described in the specification. Once completed, the submission(s) are communicated to, and received at the server 104 (STEP 312). The submitted submission(s) are then subject to a review/voting process (STEP 316). In one embodiment, one or more reviewers (e.g., skilled, experienced and/or highly rated experts, focus groups, a customer, etc.) compare the submission(s) to the specification, and evaluate them. In one embodiment, one or more content submissions that are the "best" of the submissions are selected in response to the review/voting (STEP 320).

Figure 4:
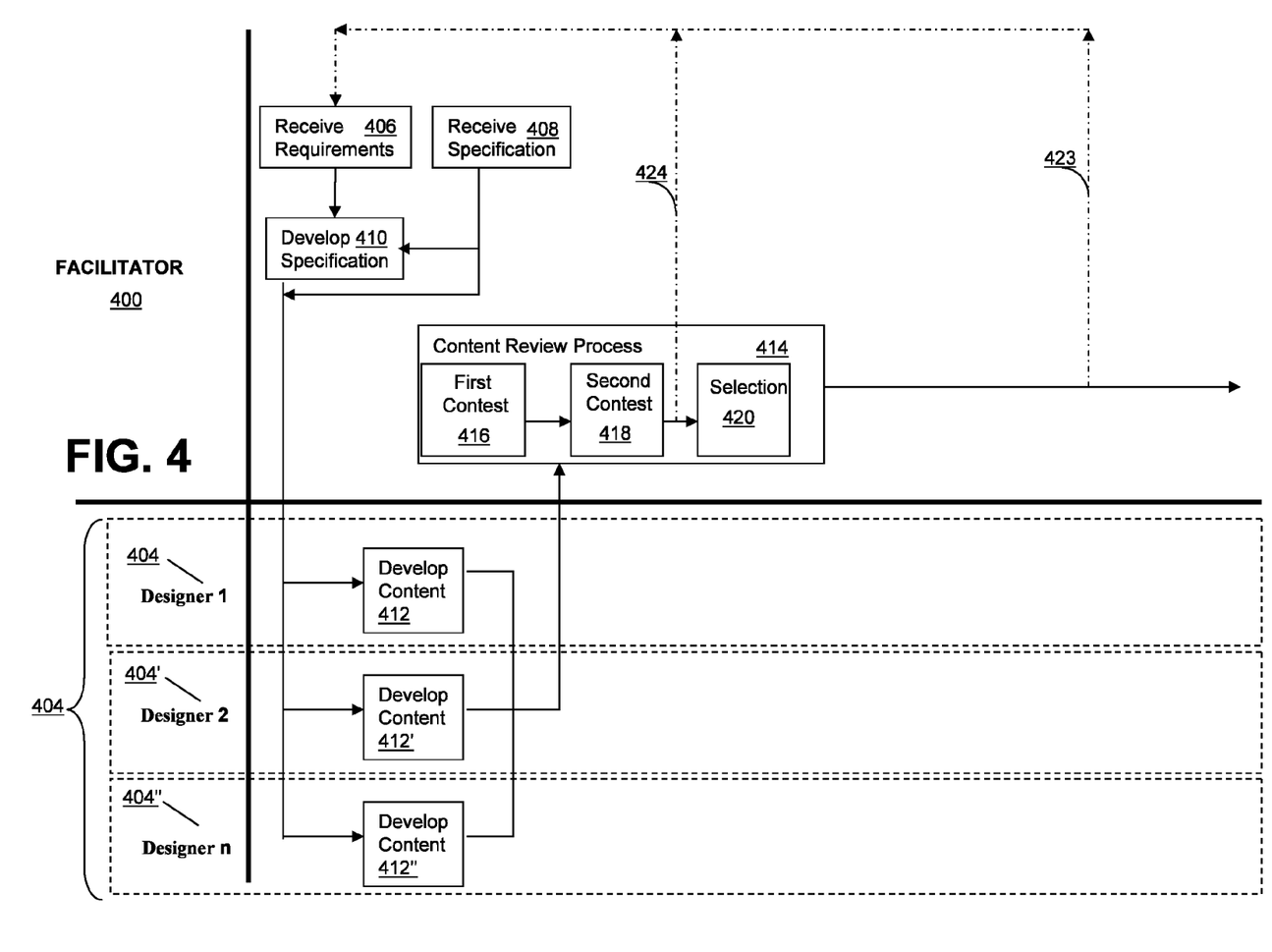
FIG. 4 is a flow chart depicting an overview of the operation of an embodiment of the invention.

FIG. 4 provides one possible implementation of the general method described above. In some such embodiments, the content development process is monitored and managed by a facilitator 400. The facilitator 400 can be any individual, group, or entity capable of performing the functions described here. In some cases, the facilitator 400 can be selected from the distributed community of content developers 208 based on, for example, success with previously submitted content and/or achieving a high ranking. In other cases, the facilitator 400 can be appointed or supplied by the entity (e.g., entity 208) requesting the development of the submission, and thus oversee the content development process for further assurance that the end product will comport with the specifications.

Initially, the facilitator 400 receives input from an entity (not shown) wishing to have content developed on their behalf. The entity can be, for example, a company looking to have one or more computer programs designed and/or developed for internal use, or as portions of larger applications that they intend to sell commercially. The entity can be, for example, a company looking to redesign its web pages. The entity can be, for example, a company that would like to have a corporate logo designed. The entity can be, for example, a company that would like a design for a banner advertisement to be displayed on Internet web sites. The entity may be a web site that is looking for content about a particular subject. In some cases, the entity provides a detailed specification with the requirements for the design, and in other cases only a short list of requirements may be provided. The facilitator receives either the short list of requirements (STEP 406), the full specification (STEP 408), or in some cases both from the external entity. If, however, no specification is provided, or if the specification needs revisions to conform to the methodology, the facilitator can develop a specification in accordance with the requirements (STEP 410). For example, the requirements may describe only the appearance of the submission, while the specification will include the technical requirements for submission (e.g., file format, graphic size, and the like). In some cases, one or more members 404 of the content development community 212 may be asked to develop the specification, and in some cases multiple specifications may be submitted, with one of the submissions selected as the final specification to be used for guiding the content development effort.

In some cases, the specification is assigned a difficulty level, or some similar indication of how difficult the facilitator, entity, or other evaluator of the specification, believes it will be to produce a submission according to the specification. The difficulty level may, in some cases, also be based on the effort believed to be necessary to complete the task, and the time allotted to complete the task. The difficulty level may be expressed in any suitable manner, for example as a numerical measure (e.g., a scale of 1 to 10), a letter grade, or a descriptive such as easy, medium, or hard. For example, a specification for the design of a web site with many color and text constraints may have a difficulty level of 9 on a scale of 1 to 10, whereas a simple logo design that is to be used on a web site may be assigned a difficulty level of 2. If there are additional practical constraints, for example if the content is needed in a short amount of time (e.g., two days), the difficulty level optionally may be increased due to the tight time constraints. In some embodiments, an award to the submitter (e.g., money, skill rating, etc.) that submits the selected submission may be produced or adjusted based in part on the difficulty level associated with the specification.

Once the specification is received (or developed), the facilitator 400 (or in some cases a project manager, review board member, or some combination thereof) may review the specification to determine if it meets the requirements for a complete specification according to the content development methodology 220. The methodology can include best-practice activities, templates, guidelines, and standards that assist the content developers in producing quality content in a consistent and efficient manner. The use of such a methodology reduces the need to rethink and recreate the presentation of the submission, thus reducing project duration and cost, and increasing quality.

Once complete, the specification may be distributed via the communications server 212 to one or more content developers 404, 404', 404" (generally, 404), who may be members, for example, of a distributed community of content developers such as the community 212 shown in FIG. 2. In one non-limiting example, the content developers 404 are not related to each other. For example, the content developers may have no common employer, may be geographically dispersed throughout the world, and in some cases have not previously interacted with each other. However, as members of the community 212, the content developers 404 may have participated in one or more previous content development competitions, and/or have had previously submitted content subject to reviews. This approach allows an entity 208 to gain access to a large pool of qualified content developers.

The communication can occur over a communications network such as the network 112 (FIG. 1), such as via an email, instant message, text message, a posting on a web page accessible by the web browser 116, through a news group, facsimile, or any other suitable communication. In some embodiments, the communication of the specification can be accompanied by an indication of a prize, payment, or other recognition that is available to the content developer(s) that submit selected submissions. In some cases, the amount and/or type of payment may change over time, or as the number of participants increases or decreases, or both. In some cases multiple content developers may be rewarded with different amounts, for example a larger reward for the best submission, and a smaller reward for second place. The number of content developers receiving an award can be based on, for example, the number of content developers participating in the content development project, or other similar attributes.

The recipients of the specification can be selected by various means. In some embodiments, members of the community may have expressed interest in participating in a content development project, whereas in some cases the individuals are selected based on previous performances in content development competitions, prior development projects, or other methods of measuring the skill of a content developer. For example, the members of the distributed community of content developers may be content developers who have previously participated in a competition, or (e.g., in the case of software designs) an on-line programming and/or coding and/or component design competition, or (e.g., in the case of other content) have demonstrated or claimed relevant expertise. In such a case, the skills of the participants may have been rated according to their performance, either individually, as a team, or in relation to others, and the ratings may be used to determine which content developers are eligible to receive notification of a new specification or respond to a notification.

In one embodiment, the facilitator 400 moderates a collaborative forum among the various participants (the external entity 208, the developers 404, etc.) to determine, discuss, or collaborate on content development features. The collaborative forum can consist of developers, customers, prospective customers, or others interested in the development of certain content. In one embodiment, the collaboration forum is an online forum where participants can post ideas, questions, suggestions, or other information. In some embodiments, only a subset of the forum members can post suggestions to the forum.

Upon receipt of the specification, one or more content developers 404 each develop content (STEPS 412, 412' and 412") in accordance with the specification. The development of the content may be done using any suitable development system, for example, content development software 224 provided via the communication server 216, a development environment provided by the developer 404, or some combination thereof, or otherwise. Once a developer 404 is satisfied that her submission meets the specified requirements, she submits her submission e.g., via the communications server 216, facsimile, email, mail, or other method.

To determine which submission will be selected, a content review process (STEP 414) is used. This process can take place in any number of ways. In some embodiments, a two-phase voting process is used. A first contest 416 is held using a first voting technique in which a group of the distributed community to select a number of submissions as finalists. The first contest may include each voter predicting which of the submissions are likely to be finalists, and in which order. A second contest 418 is held using a second voting technique, in which the finalists are selected. In some such embodiments, the second voting technique is different from the first voting technique.

There may or may not be a screening review prior to one or the other of the contests to determine whether the required elements of the specification are met (e.g., color selection, color range, required text, size and resolution of graphic images, etc.).

In some embodiments, a voter's scores are documented using a scorecard, which can be any form, including a document, spreadsheet, online form, database, or other electronic document.

In some embodiments, the scores and reviews from the first contest are aggregated into a final review and score. In some embodiments, the aggregation may involve using a computer-based system which resides on the server 104 (FIG. 1). In some embodiments, the facilitator 400 or a review board member resolves discrepancies or disagreements among reviewers.

In one embodiment, the submission(s) with the highest score in the second contest is selected as the winning submission (STEP 420). A prize, payment and/or recognition is given to the submitter. There can also be prizes, payments, and/or recognition for the other submitted content. For example, the submitters that submit the second and third best content may also receive payment, which in some cases may be less than that of the winning content developer. Payments may also be made for creative use of technology, submitting a unique design, or other such submissions. In some embodiments, the voters in the first contest and/or the second contest who were closest to predicting the winner(s) also receive a prize. It may be the a voter's score is tracked over multiple contests, and a voter with the highest overall score is rewarded.

In some embodiments, in the content review process 414, in addition to the two contests, there may be review by reviewers, such as a review board who can provide a report and/or evaluation of the submission, for example, whether the submission meets particular technical, legal, or other requirements. The facilitator 400 may provide the winning submission to the entity that requested the content.

In some embodiments, the content review process 414 may be conducted in concert with a community of reviewers. In one such embodiment, the developed content are first screened to determine whether the required elements of the specification are met. One or more screeners (who may be a review board member, a facilitator 400, or any other designated individual) verify compliance with the specification. The screener may work with the content developers to resolve any problems with the content, depending on the predetermined rules, the timing of the submission, and the nature of the problem.

In one embodiment, once a screener identifies submissions that have met some or all of the requirements of the specification, the content submissions are reviewed by a number of reviewers. There may be any number of reviewers. In one embodiment there are between 10 and 50 reviewers. In one embodiment, there are between 10 and 100 reviewers. In one embodiment there are between 10 and 1000 reviewers. In one embodiment, there are between 100 and 5000 reviewers. In another embodiment there are more than 5000 reviewers. The reviewers review the submitted content and rate them, for example in the manner described above, but it may be a simpler review, for example, just a rating of preference, with no other criteria requested.

It should be understood that the review of the content can take place in any suitable way, depending on the number of reviewers and the number of content.

In one embodiment, one or more screeners determine whether submissions have met the formal requirements of the specification for example, that a submission is complete and that the submission has met the required file formats and documentation. A review board of a small number of reviewers (e.g., 1, 3, or 5) reviews the submissions and evaluates the content for objective compliance with the specification. For example, if text is required, the reviewers review the text to determine whether it is present and correct to meet the requirements of the specification. The review board may also review the content for aesthetic or other more subjective criteria. The results of the review board are evaluated, and a predetermined number of "best" content are selected, based on the results of the review board's evaluation. Prizes or awards may be given to the content developers whose content met this selection. In one embodiment, the "best" content are then provided to a larger group of reviewers, for example, with the first contest/second contest process described above. The larger group of reviewers can use the same criteria as the review board, or can provide a simpler like/dislike feedback, or a preference rank. Each of the content submissions presented to the larger group are the ones that have most closely met the specification criteria, so the larger group can be used to determine the submission(s) that have a more general appeal. Also, the review board typically will include experienced content developers, while the larger group might include more members of the intended audience for the submission.

It also should be understood that in various implementations, the review by one or more screeners, by one or more review board members, and by one or more members of the larger group can take place in any order. It also should be understood that there can be any number of participants in the various levels of review. Thus, in one embodiment, a larger group is used as a first stage of review (e.g., in a first contest), to reduce the set of submissions to a small number of candidates, and then the smaller number of candidates are reviewed by a smaller group (e.g., in a second contest). In another embodiment, a smaller group is used as a first stage of review, to reduce the set of submissions to a small number of candidates, and then the smaller number of candidates are reviewed by a larger group. Likewise, there may be multiple levels of review (not shown), in which larger or smaller groups participate in the review. In one such embodiment, increasingly larger groups of reviewers (e.g., three, four, or more groups of reviewers) are consulted as the number of candidates is reduced. In another embodiment, increasingly smaller groups of reviewers (e.g., three, four, or more groups of reviewers) are consulted as the number of candidates is reduced.

In one embodiment, the selected submission(s) (STEP 423) are used iteratively as input for another round of development. The submission(s) are included, as part of the requirements 406 and specification 410 for another round of development. The entity that requested the submission can further refine the specification based on the results from the previous round. For example, if an initial repetition of the method results in the selection of three submissions, those three content submissions can be included in the specification, with an indication of the aspects of those features that are desired. In the revised specification, content developers may be asked to include aspects of those features in their submissions in a following round.

In another embodiment, the results from a part of the development cycle (e.g., prior to the selection by a larger group of reviewers) are included in another specification. For example, in one embodiment, the members of a review board, which includes members of the entity requesting the content, identify one or more content submissions from the initial screening 416 that have desirable features, but are not themselves acceptable as a whole submission. Instead of continuing the process as described above and sending the content for review by the larger group of reviewers, the review board selects those content submissions that have desirable features to be the winners, so that the designers of the content can be appropriately rewarded. The selected content submissions are then incorporated (STEP 424) into a revised specification, which is then communicated to the content developers.

It is also possible to stop at other possible places in the process, and revise the specification with additional information (external information, or information generated by the process) so long as the content developers feel that they are treated properly by the change in process.

In iterative embodiments, there can be any number of rounds in which output from one round is used as part of the input for the next round. Through such an iterative process, e.g., by taking the output 423, 424 and using that as input for another round, it is possible for the entity that is requesting the content to come incrementally closer to a desired result, with a process that allows freedom and creativity for the content developers within the guidelines of the specification.

Figure 5:
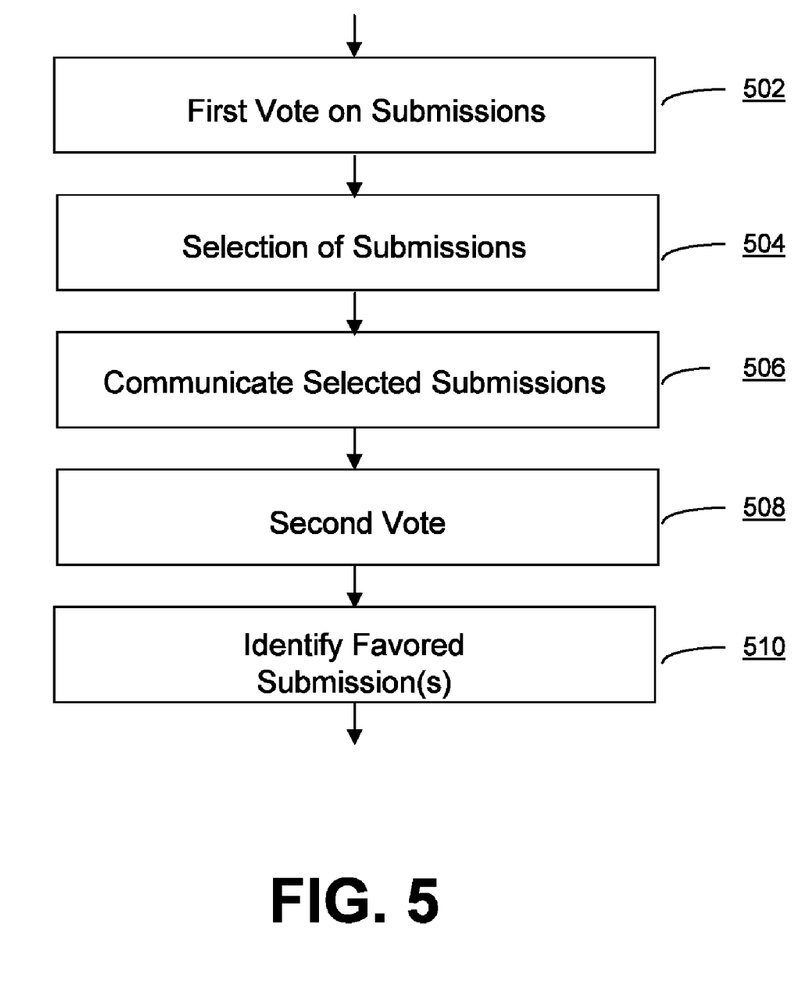
FIG. 5 is a flow chart depicting steps performed in developing content according to an embodiment of the invention.

Referring to FIG. 5, in one embodiment, a first contest is held on a number of submissions. In the first contest, voters may be asked to identify a predetermined number of submissions that they believe that others identify as the best. They may be asked to order the submissions.

Using a first technique, the results of the first contest are aggregated, and finalist submissions selected (STEP 504). There may be a review at this stage to verify that each of the submissions is technically compliant with any requirements, and so forth. Once this selection of candidate submissions has taken place, then a second contest may be held to identify the best of the finalists.

For example, in one exemplary embodiment, after screening, there are 100 submissions that meet the criteria of the requirements. The facilitator decides that because of the nature of the content, it would be best to provide reviewers with 5 candidates from which to choose. The 5 best-scoring candidates are selected in the first contest. In the second contest, voters are asked to vote for the best of the 5.

The number of submissions selected can be any number that is suitable for selection by a larger group. For example, in some embodiments, 2, 3, 4, 5, 10, 15, or 20 finalists may be selected. In some embodiments, The facilitator, client, or other administrator may "cull" submissions that the are not perceived as favorable and/or potentially acceptable.

Depending on the number of voters, there are different techniques that can be used to select the candidates. In one embodiment, the system facilitates the review by the voters by presenting the choices to the voters, with a mechanism to provide feedback. The feedback can be a simple indication of the preference of each (e.g., yes/no, or numerical evaluation) or a ranking (e.g., assigning an order of preference) to each. Any suitable technique can be used to solicit and aggregate response indicia from the voters. In one embodiment, each voter gets one or more "veto" votes to eliminate a candidate that he doesn't like.

The voters may interact with the communication server 104, for example, using client software 124, to review the submissions and select the submissions that should be provided to the reviewing community.

In one embodiment, the voter (and or an administrator such as the facilitator) also considers a review of the submission from the perspective of authorship and intellectual property issues. For example, the voter may consider how similar the submissions are to submissions offered by competitors or others, to further a potential goal that the submission, if selected, will not raise concerns from third-parties. The voter may also consider the protectability of the submission, with regard to copyright and trademark law. This may involve legal review, or other techniques to eliminate potential problems that may be raised by the set of candidates. Although potentially more time consuming to consider a number of candidates at this stage, rather than once a single choice is selected, it may be preferable to do so in some situations.

Once the candidate set is identified, the finalists are communicated to voters as part of the second contest (STEP 506). The voters may be the intended audience for the content, for example, customers and potential partners of the company for a web site that is being designed. The voters may be, in the case of a web page interface, for example, potential users of the web page. The voters may include other content developers, members of the requesting entity (e.g., employees of the company such as sales and marketing personnel), or any other suitable group or combination of groups of people. In one embodiment, the voters include people who are not affiliated with the entity, but who have agreed provide their opinion about the content. The demographics (e.g., where they live, what language(s) do they speak, their ages, incomes, etc.) may be important considerations in selecting the voters.

The voters may be compensated in some way for their participation. For example, the voters may be provided with monetary or other rewards or prizes, or the opportunity to participate in a lottery for such reward. Participation in one or more contests as a voter may be a requirement for submission of content. For example, in one embodiment, a content developer needs to participate in a predetermined number of votes during a predetermined time period (e.g., week, month, calendar quarter) in order to have an ability to submit submissions.

The voters may be ranked and/or rated, for example based on how reliable they are, how quickly they respond, and/or how well their selections comport with the selection of the larger group(s) in the review(s) that they participate in.

In one embodiment, a group of reviewers are invited by email to review a submissions. Each of the reviewers receives an email message directing them to a web page that includes the list of candidate submissions. In the case of a logo, the candidates are displayed on the page, with any additional information needed for review, as well as a selection tool for assigning response indicia. For example, if there are ten candidate submissions, each submission can be assigned a response indicia from 1 to 10, and the reviewer is asked to assign a number to each submission in order of the reviewer's preference for the submission. In another example, the reviewers are asked to evaluate specific characteristics of the submission (e.g., color, text layout, thematic representation, etc.) and/or give an overall evaluation or preference. The specific characteristics may be evaluated individually, or by assigning a number to each in order of preference. In another example, a free-form text entry field may be provided where the reviewers can describe the specific attributes (color, text, graphics, layout, etc.) of each submission that they like or dislike.

While any suitable interface can be used, presenting the submissions in a manner that allows each candidate submission to be compared to each other, facilitates efficient review by each reviewer. It also allows for effective aggregation as described below. If the submissions can not easily be compared on the same page, there can be an indicator for the submission on the review page, for example with a summary image for the submission, and links to the full presentations of the candidate submissions. Any suitable system for providing a response indicia can be used, depending on the method used for aggregating the results. Generally, a web page may used to collect the reviewers feedback on the submissions (STEP 508), although, any suitable technique may be used, including without limitation selection by telephone, mobile telephone, review application, and so on.

After review, the results from the reviewers can be aggregated, for example, by any suitable method, to identify the most preferred submission(s) (STEP 510). For example, in one embodiment, the Schulze method is used for the comparison. The Schulze method has the advantage that if there is a candidate that is preferred pairwise over the other candidates, when compared in turn with each of the others, the Schulze method guarantees that that candidate will win. Other methods that are Condorcet methods (i.e., promote the pairwise winner) are also may be suitable, as may be any other suitable voting system, such as Borda and Instant-runoff voting.

In general, it can be useful to select a number of candidates in their order of preference, and also to communicate how close the response was from the larger group of reviewers with regard to the top selections. For example, the requesting entity may not prefer the top choice selected by the reviewers, but might prefer to select on its own from the finalists determined by the larger group. The requesting entity may conduct other review (e.g., marketing surveys, international review, legal review) of the most highly evaluated content, and additional review may turn out to raise legal concerns that would foreclose adoption.

When content is selected, the original content developer can be engaged to do additional work with the submission or another content developer can be engaged. Typically, the content developer's submission will include all of the information and documentation (including electronic copies of the submission in appropriate formats) such that the submission is usable in its intended context.

In one embodiment, content developers that submit submissions are rated based on the results of their submissions. The ratings are calculated based on the ratings of each content developer prior to the submission, and such other factors as an assigned difficulty level of the submission submitted, and the number of other content developers making submissions, and the feedback received for the submission.

Although described here with reference to certain submissions, and useful when implemented with regard to aesthetic, artistic, or graphic submissions, the cooperatively developed work product can be any sort of tangible or intangible content that embodies intellectual effort or intellectual property. As non-limiting examples, the techniques could be used for computer hardware and electronics submissions, or other submissions such as architecture, construction, music, or landscape design. Other non-limiting examples for which the techniques could be used include the development of all kinds of written documents and content such as documentation and articles for papers or periodicals (whether on-line or on paper), research papers, scripts, multimedia content, legal documents, and more.

What is claimed is:

1. A method for developing content, comprising:
   electronically distributing a specification for content to a distributed community of content developers;
   receiving submissions from each of a subset of the community of designers in response to the distributed specification;
   holding a first vote among a first group of voters comprising a first contest in which the first group of voters rank a first number of submissions and identify the order in which they the group of voters predict the submissions will be ranked by voters other than the first group of voters;
   holding a second vote among a second group of voters to evaluate the submissions that receive the highest score in the first vote; and
   selecting a winner based on the second vote.

2. The method of claim 1, further comprising, prior to the first contest, reviewing the submissions for intellectual property issues.

3. The method of claim 1, wherein the intellectual property issues comprise originality.

4. The method of claim 1, wherein the intellectual property issues comprise authorship.

5. The method of claim 1, wherein the intellectual property issues comprise copyright.

6. The method of claim 1, further comprising, prior to the second contest, reviewing the submissions for intellectual property issues.

7. The method of claim 1 wherein the content is a graphic design.

8. The method of claim 1 wherein the content comprises music.

9. The method of claim 1, wherein the first contest uses a Schulze type method for comparison.

10. The method of claim 1, wherein the first group of voters are rewarded for their participation.

* * * * *

UNITED STATES PATENT AND TRADEMARK OFFICE
CERTIFICATE OF CORRECTION

| | | |
|---|---|---|
| PATENT NO. | : 8,073,792 B2 | Page 1 of 1 |
| APPLICATION NO. | : 12/048189 | |
| DATED | : December 6, 2011 | |
| INVENTOR(S) | : John M. Hughes | |

It is certified that error appears in the above-identified patent and that said Letters Patent is hereby corrected as shown below:

In Claim 1, column 14, line 34, please delete "they".

Signed and Sealed this
Thirty-first Day of January, 2012

David J. Kappos
*Director of the United States Patent and Trademark Office*